United States Patent
Zeryihun et al.

(10) Patent No.: US 10,699,574 B1
(45) Date of Patent: Jun. 30, 2020

(54) PARKING INFORMATION SHARING SYSTEM USING BLOCKCHAIN

(71) Applicant: Ford Global Technologies, LLC, Dearborn, MI (US)

(72) Inventors: Amanuel Zeryihun, Pinole, CA (US); Pramita Mitra, West Bloomfield, MI (US); Prashant Rao, Ypsilanti, MI (US); Abhishek Sharma, Ann Arbor, MI (US); David Melcher, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/260,788

(22) Filed: Jan. 29, 2019

(51) Int. Cl.
| B60Q 1/48 | (2006.01) |
| G08G 1/14 | (2006.01) |
| H04L 9/06 | (2006.01) |
| H04W 72/00 | (2009.01) |
| G06T 7/80 | (2017.01) |
| H04L 9/32 | (2006.01) |

(52) U.S. Cl.
CPC ............... G08G 1/14 (2013.01); G06T 7/80 (2017.01); H04L 9/0618 (2013.01); H04L 9/3268 (2013.01); H04W 72/005 (2013.01); H04L 2209/38 (2013.01)

(58) Field of Classification Search
None
See application file for complete search history.

(56) References Cited

U.S. PATENT DOCUMENTS

| 2012/0056758 A1 | 3/2012 | Kuhlman et al. |
| 2017/0132541 A1* | 5/2017 | Myers ............. G06Q 10/06311 |
| 2018/0232958 A1* | 8/2018 | Wang ...................... G07F 17/24 |
| 2019/0034465 A1* | 1/2019 | Shimamura ........... H04L 9/3239 |
| 2019/0295415 A1* | 9/2019 | Haneda .................. G08G 1/149 |

FOREIGN PATENT DOCUMENTS

| WO | 2017190794 A1 | 11/2017 |
| WO | 2018096985 A1 | 5/2018 |

OTHER PUBLICATIONS

Zhou, Jifu et al., "Detection of Parking Spots Using 2D Range Data," 2012 15th International IEEE Conference on Intelligent Transportation Systems, Anchorage, AK, USA, 8 Pages.
Zhao, Xuejian et al., "An Algorithm of Parking Planning for Smart Parking System," Proceedings of the World Congress on Intelligent Control and Automation (WCICA), 2015. 4965-4969. 5 Pages.

* cited by examiner

*Primary Examiner* — Adolf Dsouza
(74) *Attorney, Agent, or Firm* — Brooks Kushman PC

(57) ABSTRACT

A vehicle includes a controller, programmed to responsive to detecting a parking space via a camera, generate a parking message including location information about the parking space; broadcast the parking message to fleet vehicles within a predefined geo-fence, each of the fleet vehicles serving as a node of a blockchain network; and receive a predefined reward, via the blockchain network, from one of the fleet vehicles having successfully occupied the parking space.

19 Claims, 6 Drawing Sheets

PARKING INFORMATION SHARING SYSTEM USING BLOCKCHAIN

TECHNICAL FIELD

The present disclosure is generally related to an information sharing system between vehicles. More specifically, the present disclosure is related to a system for sharing parking information between fleet vehicles.

BACKGROUND

Finding a parking spot for a vehicle may be difficult in some urban area and sometimes a vehicle has to circle around an area many times to find one. Some parking information are available online. However, that information may be unreliable. For instance, the online parking information may be out-of-date. Even if the information is live, by the time the vehicle gets to the target parking space, it might have already been taken by someone else.

SUMMARY

In one or more illustrative embodiments of the present disclosure, a vehicle includes a controller, programmed to be responsive to detecting a parking space via a camera, generate a parking message including location information about the parking space; broadcast the parking message to fleet vehicles within a predefined geo-fence, each of the fleet vehicles serving as a node of a blockchain network; and receive a predefined reward, via the blockchain network, from one of the fleet vehicles having successfully occupied the parking space.

In one or more illustrative embodiments of the present disclosure, a system for a vehicle includes one or more controllers, programmed to be responsive to receiving, from a source vehicle serving as one of a plurality of fleet vehicles each operating as a node of a blockchain network, a parking message reporting a parking space, evaluate the parking message to detect if the vehicle will fit into a parking space; responsive to detecting the vehicle will fit into the parking space, set a location of the parking space incorporated in the parking message as a navigation destination; and responsive to detecting the vehicle successfully occupied the parking space, send a predefined payment to the source vehicle via the blockchain network.

In one or more illustrative embodiments of the present disclosure, a method for a vehicle includes entering into a parking information reporting mode by activating a camera and multiple sensors to detect an available parking space within a predefined vicinity of the vehicle; responsive to detecting the parking space, measuring a size of the parking space; generating a parking message incorporating information describing a location of the parking space, the size of the parking space, and a designated price of a reward; broadcasting the parking message to a predefined blockchain network within a predefined geo-fence; and receive the designated reward from one of a fleet vehicle successfully occupied the parking space via blockchain network.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a vehicle parking vacancy sharing system. More specifically, the present disclosure proposes a peer-to-peer network for sharing information about vehicle parking spaces detected via fleet vehicles and providing incentives to sharing such information.

Figure 1:
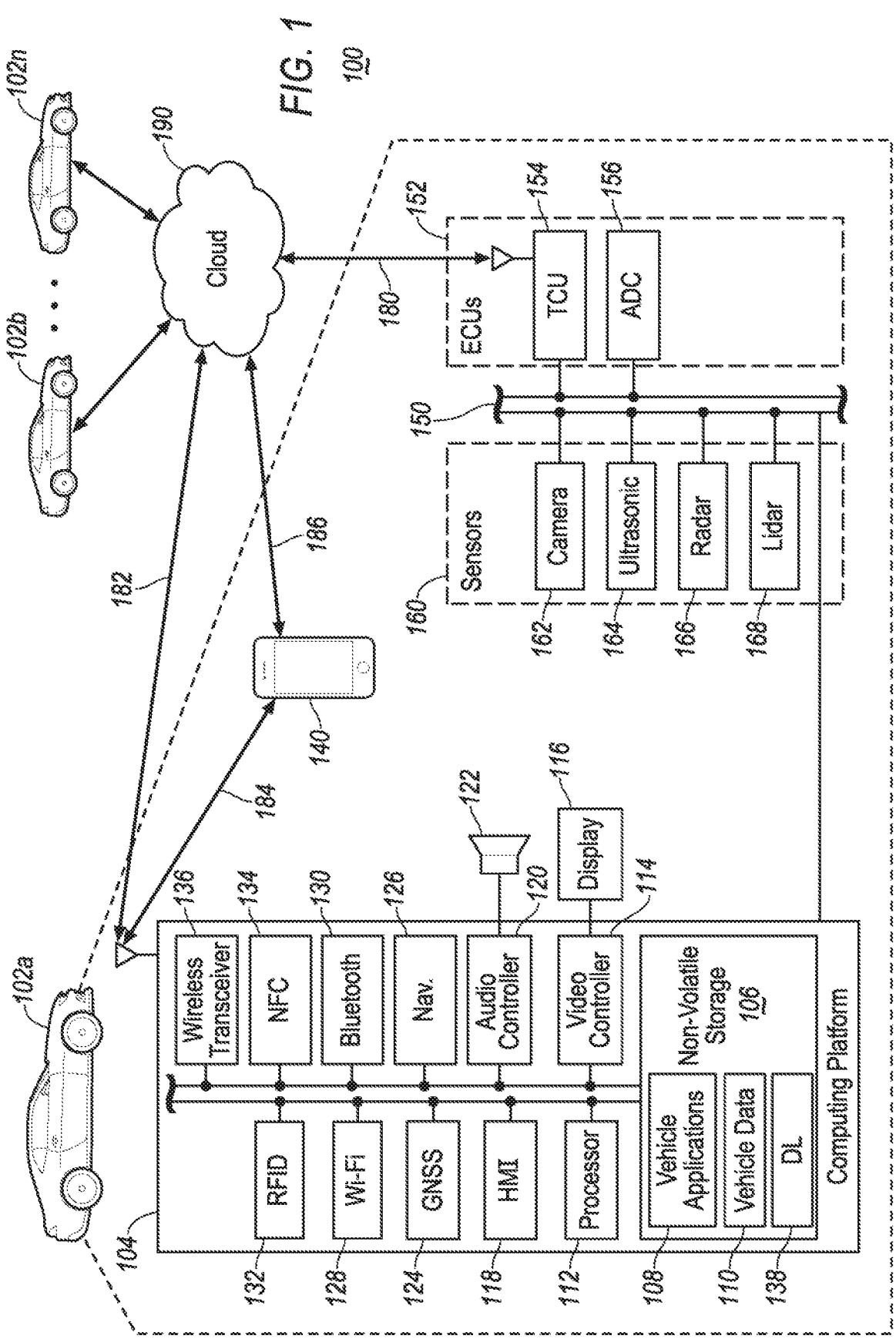
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102a may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be battery electric vehicle (BEV), a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 112 configured to perform instructions, commands, and other routines in support of the processes described herein. For instance, the computing platform 104 may be configured to execute instructions of vehicle applications 108 to provide features such as navigation, wireless communications, and blockchain processing. Such instructions and other data may be maintained in a non-volatile manner using a variety of types of computer-readable storage medium 106. The computer-readable medium 106 (also referred to as a processor-readable medium or storage) includes any non-transitory medium (e.g., tangible medium) that participates in providing instructions or other data that may be read by the processor 112 of the computing platform 104. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, PL/SQL Ethereum, and Hyperledger Fabric.

The computing platform 104 may be provided with various features allowing the vehicle occupants/users to interface with the computing platform 104. For example, the computing platform 104 may receive input from human-machine interface (HMI) controls 118 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 116 configured to provide visual output to vehicle occupants by way of a video controller 114. In some cases, the display 116 may be a touch screen further configured to receive user touch input via the video controller 114, while in other cases the display 116 may be a display only, without touch input capabilities. The computing platform 104 may also drive or otherwise communicate with one or more speakers 122 configured to provide audio output to vehicle occupants by way of an audio controller 120.

The computing platform 104 may also be provided with navigation and route planning features through a navigation controller 126 configured to calculate navigation routes responsive to user input via e.g., the HMI controls 118, and output planned routes and instructions via the speaker 122 and the display 116. Location data that is needed for navigation may be collected from a global navigation satellite system (GNSS) controller 124 configured to communicate with multiple satellites and calculate the location of the vehicle 102. The GNSS controller may be configured to support various current and/or future global or regional location systems such as global positioning system (GPS), Galileo, Beidou, Global Navigation Satellite System (GLONASS) and the like. Map data used for route planning may be stored in the storage 106 as a part of the vehicle data 110.

Navigation software may be stored in the storage 116 e.g. as a part of the vehicle applications 108.

The computing platform 104 may be configured to wirelessly communicate with a mobile device 140 of the vehicle users/occupants via a wireless connection 184 through a wireless transceiver 136. The mobile device 140 may be any of various types of portable computing device, such as cellular phones, tablet computers, smart watches, laptop computers, portable music players, or other device capable of communication with the computing platform 104. The wireless transceiver 136 may be in communication with a Wi-Fi controller 128, a Bluetooth controller 130, a radio-frequency identification (RFID) controller 132, a near-field communication (NFC) controller 134, and other controllers such as a Zigbee transceiver, an IrDA transceiver (not shown), and configured to communicate with a compatible wireless transceiver (not shown) of the mobile device 140.

The computing platform 104 may be further configured to communicate various electronic control units (ECUs) 152 and sensors 160 via one or more in-vehicle network 150. The in-vehicle network 150 may include, but is not limited to, one or more of a controller area network (CAN), an Ethernet network, and a media-oriented system transport (MOST), as some examples.

The ECUs 152 may include a telematics control unit (TCU) 154 configured to control telecommunication between vehicle 102 and a cloud 190 through a wireless connection 180 using a modem (not shown). Additionally or alternatively, the computing platform 104 may be configured to communicate with the cloud 190 via the mobile device 140 through a wireless connection 186. The computing platform 104 may be further configured to directly communicate with the cloud 190 via the wireless transceiver 136 using compatible protocols through a wireless connection 182. The cloud 190 may include one or more servers, or computers connected via various types of wired or wireless networks. It is noted that the term cloud is used as a general term throughout the present disclosure and may refer to any cloud-based services involving multiple servers, computers, devices and the like.

The vehicle 102a may be configured to establish a P2P network with various fleet vehicles 102b . . . 102n via the cloud 190. The feet vehicles 102b . . . 102n may be any vehicles subscribed to the same service. As an example, the vehicle 102a and the fleet vehicles 102b . . . 102n may be subscribed to a decentralized parking information sharing and reward network using blockchain technology. Each vehicle may maintain a distributed ledger (sometimes referred to as DL) locally. For instance, the vehicle 102a may maintain a distributed ledger 138 in the storage 106.

The ECUs 152 may further include an autonomous driving controller (ADC) 164 configured to monitor and control the autonomous driving features of the vehicle 102. For instance, the vehicle 102a may be an autonomous driving vehicle provided with various full or partial autonomous driving features with or without human involvement. The ADC 156 may be configured to communicate with a fleet manager among the cloud 190 via the TCU 154 to receive destination instructions and automatically operate the vehicle 102a to the destination via the GNSS controller 124 and the navigation controller 126. The ADC 156 may be further provided with automatic parking features configured to maneuver the vehicle 102a into a designated parking space that is big enough for the vehicle 102a to fit into detected via various sensors 160.

The vehicle 102a may be provided with various sensors 160 configured to detect and measure object and spaces at the vicinity of the vehicle 102a. For instance, the sensors 160 may include one or more cameras 162 configured to capture images near the vehicle 102a. As an example, the camera 162 may be located behind the windshield of the vehicle 102a facing forward to capture an image in front of the vehicle 102a. Alternatively, the front-facing camera 162 may be installed elsewhere, such as on the grille or inside the engine bay of the vehicle 102a. Additionally or alternatively, the camera 162 may be located at the back of the vehicle 102a to function as a backup camera. Additionally or alternatively, the camera 162 may be a surrounding view camera including multiple camera sensors configured to capture multiple images around the vehicle 102a and generate a surrounding view around the vehicle 102a. The camera 162 may be configured to switch on automatically, e.g., responsive to the start/activation of the vehicle 102. Alternatively, the camera 162 may be manually switched on/off using the input device 128 by way of the HMI controls 126. The image data captured by the camera 162 may be fed into the computing platform 104 via the in-vehicle network 150 and displayed on the display 116 via the video controller 114, allowing the user/occupant to see objects in front of and/or behind the vehicle 102. Alternatively, the computing platform 104 may be configured to process images received from the camera 162 without displaying on the display 116.

The sensors 160 may further include one or more ultrasonic sensors 164 installed on the body of the vehicle 102a (e.g. on the front/rear bumper) configured to detect objects within their range and calculate the distance from the objects. The utilization of ultrasonic sensors 164 may improve the distance measurement on an image captured via the camera 162. The sensors 160 may further include a radar sensor 166 configured to detect object within a predefined range from the vehicle 102a to facilitate distance measurement by the computing platform 104. The radar sensor 166 may have a longer range than the ultrasonic sensors 164 and may be configured to detect metal object (e.g. vehicle body) only. The sensors 160 may further include a lidar sensor 168 configured to detect and measure objects within a predefined range from the vehicle 102a. The lidar sensor 168 may be configured to function substantially in the same way as the radar sensor operates, but the lidar sensor may remove the requirement for the object to be metal.

Figure 2:
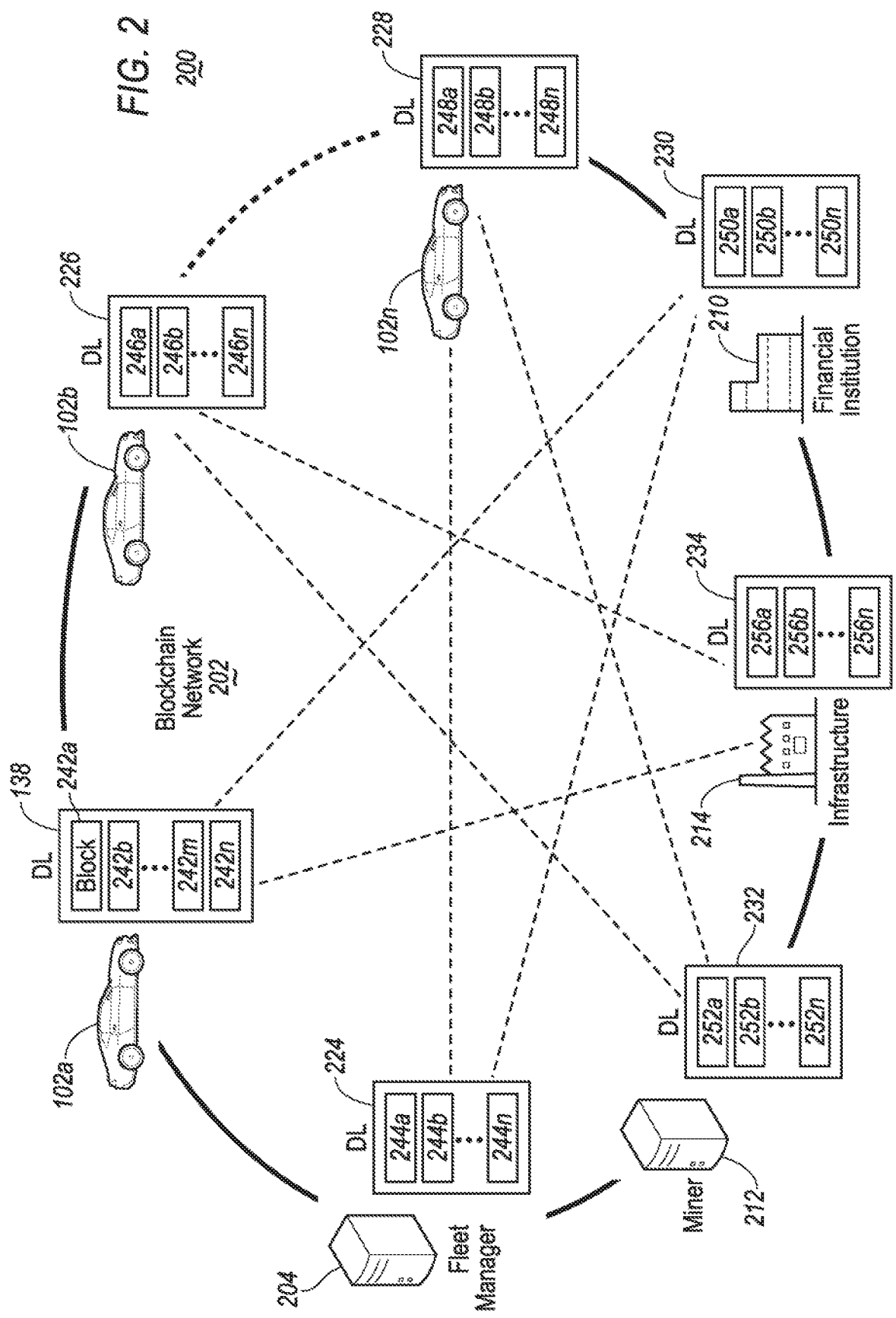
FIG. 2 illustrates an example blockchain topology diagram of one embodiment of the present disclosure.

Referring to FIG. 2, an example topology diagram 200 of a vehicle blockchain network 202 of one embodiment of the present disclosure is illustrated. The vehicle blockchain network 202 may be a peer-to-pear network having multiple nodes connected with each other. The vehicle 102a may be connected to the blockchain network 202 as a node via the various wireless connections 180, 182 and/or 186 through the cloud 190. All fleet vehicles including the vehicle 102a and vehicle 102b . . . 102n may be connected to the blockchain network using a blockchain network application. Taking the vehicle 102a for instance, the computing platform 104 may be configured to connect to the blockchain network via blockchain network application stored in the storage 106 e.g. as one of the vehicle applications 108. For instance, the blockchain network application may contain a smart contract business logic, legal rules, terms and conditions, and the like to control the blockchain network operations specified by a fleet manager 204 managing multiple fleet vehicles including the vehicle 102a. The fleet manager 204 may serve as a node of the blockchain network 202. Alternatively, the function of them fleet manager 204 may be implemented in a decentralized manner via the fleet vehicles 102a, 102b, . . . , 102n as well as other participating nodes using applications installed thereon without having a dedicated fleet manager 204 serving as a node of the blockchain network 202. Alternatively, the fleet manager 204 may be implemented using applications on top of the blockchain framework without serving as a node of the blockchain network 202. Each node of the blockchain network 202 may be configured to maintain a distributed ledger individually within its own storage device. For instance, the vehicle 102a may be configured to maintain the distributed ledger 138 stored in the storage 106. Each distributed ledger maintained by each node of the blockchain network may include multiple blocks for data logging purposes. Taking the distributed ledger 138 of the vehicle 102a for instance, the data chain included in the distributed ledger 138 may grow at a block-by-block basis. For instance, a successor block 242b may contain a cryptographic hash of a previous block 242a, a timestamp indicative of a time of creation of the successor block 242b, and transaction data stored to the successor block 242b. The same configuration may be implemented at other nodes of the blockchain network 202.

The blockchain network 202 may include multiple nodes involving various parties. As an example, the vehicle 102a may be among a fleet including multiple fleet vehicles (a.k.a. peer vehicles) such as fleet vehicles 102b . . . 102n that are managed by the fleet manager device 204 which also serves as a node of the blockchain network 202. Each of fleet vehicles 102b and 102n may maintain a distributed ledger 226 and 228 within its own storage device. Similarly, the fleet manager 204 may maintain a distributed ledger 224 within its own storage device. The blockchain network 202 may further include one or more financial institutions 210 for financial transactions maintaining a distributed ledger 230, and one or more miner 212 (a.k.a. validator) maintaining a distributed ledger 232 configured to validate transactions between nodes. The blockchain network 202 may further include one or more infrastructure device 214 maintaining a distributed ledger 234. The infrastructure device 214 may include any device related to traffic and/or parking infrastructure of a municipality. For instance, the infrastructure device 214 may include a parking meter/sensor or a street camera connected to an infrastructure network configured to share information. It is noted that the blockchain network 202 illustrated with reference to FIG. 2 is merely an example and the blockchain network 202 may include more, fewer, or different nodes involving various parties illustrated or not illustrated in FIG. 2.

Figure 3:
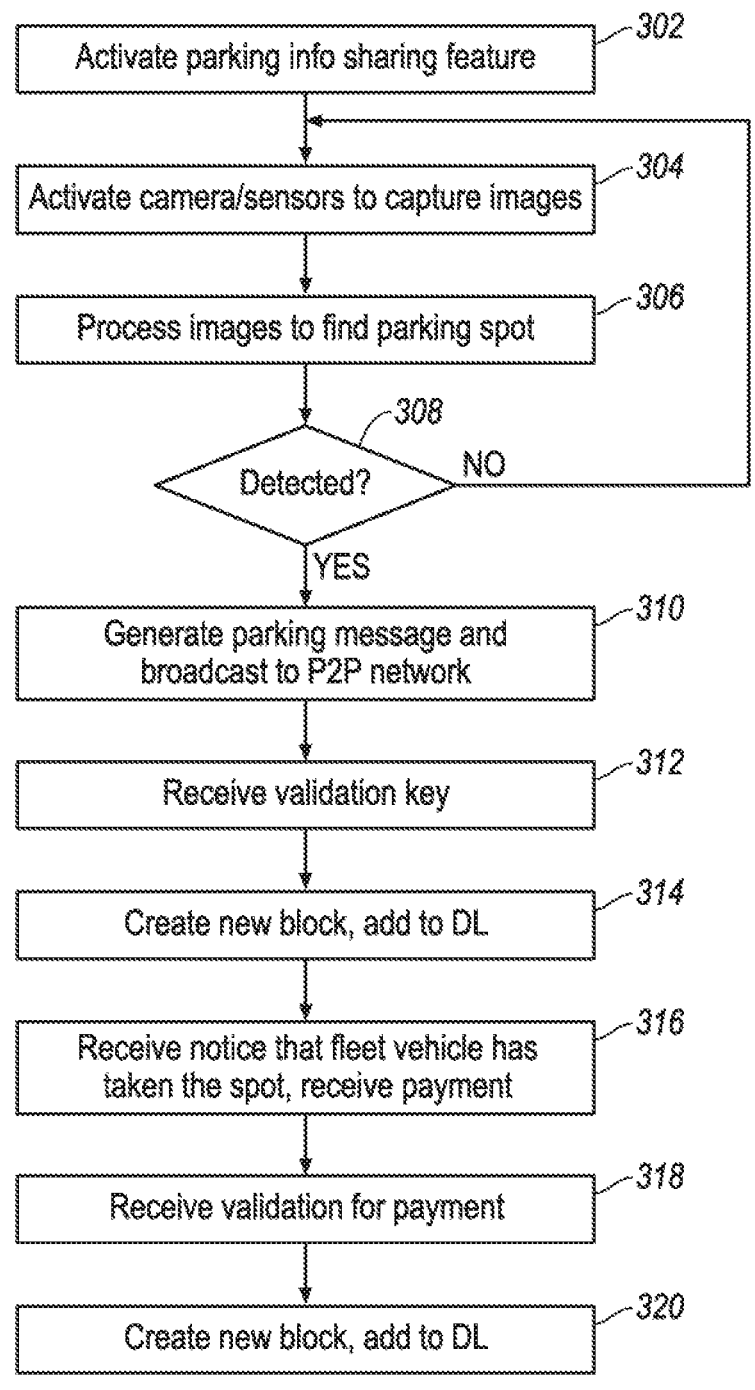
FIG. 3 illustrates an example process diagram for a process of one embodiment of the present disclosure.

Referring to FIG. 3, an example flow diagram for a process 300 of one embodiment of the present disclosure is illustrated. In the present embodiment, the process 300 is applied to a vehicle serving as a parking information source vehicle. With continuing reference to FIGS. 1 and 2, at operation 302, the computing platform 104 of the vehicle 102a activates the parking information sharing feature and enters in to the source vehicle mode (a.k.a reporting mode). The activation may be triggered by a manual input e.g. via the HMI controls 118. Alternatively, the parking information feature may be further triggered automatically responsive to detecting a predefined condition is met, such as the computing platform 104 detects the vehicle 102a has entered a pre-configured geo-fence (e.g. a downtown area) designated to enable the parking information sharing feature. Alternatively, the computing platform 104 may be further configured to automatically activate the parking information sharing feature responsive to detecting the vehicle 102a is parked to detect and report available parking spaces nearby.

Responsive to the activation of the parking information sharing feature reporting mode, the computing platform 104 activate the camera 162 as well as other sensors 160 and start to capture images nearby the vehicle 102a. At operation 306, the computing platform 104 processes the images using software as one of the vehicle applications 108 to detect vacant parking spots. The software may involve various image processing and recognition algorithms configured to detect a predefined vacant space with sufficient size for a fleet vehicle to park. If no vacant parking spot is detected in the current image being processed, the process returns to operation 304 from operation 308. Otherwise, the process proceeds to operation 310. At operation 310, responsive to detecting a vacant parking space, the computing platform 104 generates a parking message and broadcast the parking message to the blockchain network 202. The parking message may include the location of the parking space from the GNSS controller allowing the target vehicle to find the parking space. Additionally, the parking message may further include an estimated size of the parking space measured by the computing platform 104. The parking message may further include an image of the parking space captured by the camera 162 to facilitate a target vehicle to find it. After generating the parking message, the computing platform 104 may be configured to broadcast the parking message to the entire blockchain network. However, the blockchain network 202 may be of a large scale with subscribers across the country. Sharing information about the detected parking space with nodes thousands of miles away will not be very helpful. Therefore, a preferred way is to only broadcast the parking message to fleet vehicles 102b . . . 102n (as well as other entities such as the fleet manager 204) nearby the location of the detected parking space so that only potential interested parties may receive the parking message. A geofence may be used to select the broadcasting range.

At operation 312, the computing platform 104 receives a validation key from the blockchain network 202. Depending on the specific configuration of the blockchain network 202, the validation key may be performed by various parties. For instance, the validation may be performed by one or more of the fleet vehicles 102b . . . 102n. This is particularly applicable when the fleet vehicles 102a . . . 102n are subscribed to a closed blockchain network 202, e.g., the vehicle 102a and the fleet vehicles 102b . . . 102n are from the same manufacturer. Alternatively, in case that the blockchain network 202 is open to public subscription, the validation may be performed by the fleet manager 204 and/or the miner 212 designated to validate transactions on the blockchain network 202. Responsive to a successful validation for the parking message, the validating entity may broadcast a validation key to participating nodes (e.g. within the geofence) within the blockchain network 202. Responsive to receiving the validation key from the blockchain network 202, the computing platform 104 creates a new block 242 incorporating the parking message based on a previous block e.g. via hash algorithm, and adds the block to the distributed ledger 138 stored in the storage 106.

In case one of the fleet vehicles 102b . . . 102n that received the parking message responded and took the reported parking space, a notice will be sent to the blockchain network 202. At operation 316, the computing platform 104 receives the notice informing a fleet vehicle has taken the reported parking space. The notice may be received from the parking fleet vehicle. Additionally or alternatively, the notice may be received from the infrastructure device 214 if available configured to detect and identify the parking fleet vehicle, and confirm that the parking fleet vehicle has taken the reported parking space, which further enhances the accuracy and robustness of the system. The utilization of the infrastructure device 214 may be particularly helpful in case that the parking fleet vehicle is temporarily disconnected from the blockchain network 202 and unable to send the notice. In addition, the computing platform 104 may receive a predefined payment from the parked fleet vehicle. The payment may be in the form of any type of incentive, such as a token, digital currency, service credit, gas credit or the like. As an example, the payment may be converted to fiat currency and transfer to the user's bank account. Alternatively, the payment may be used by the receiving party directly without being converted to currency. At operation 318, the computing platform 104 receives a validation key for the payment and in response, the computing platform 104 creates a new block incorporating the payment based on a previous block and adds the block to the distributed ledger 138 stored in the storage 106.

Figure 4:
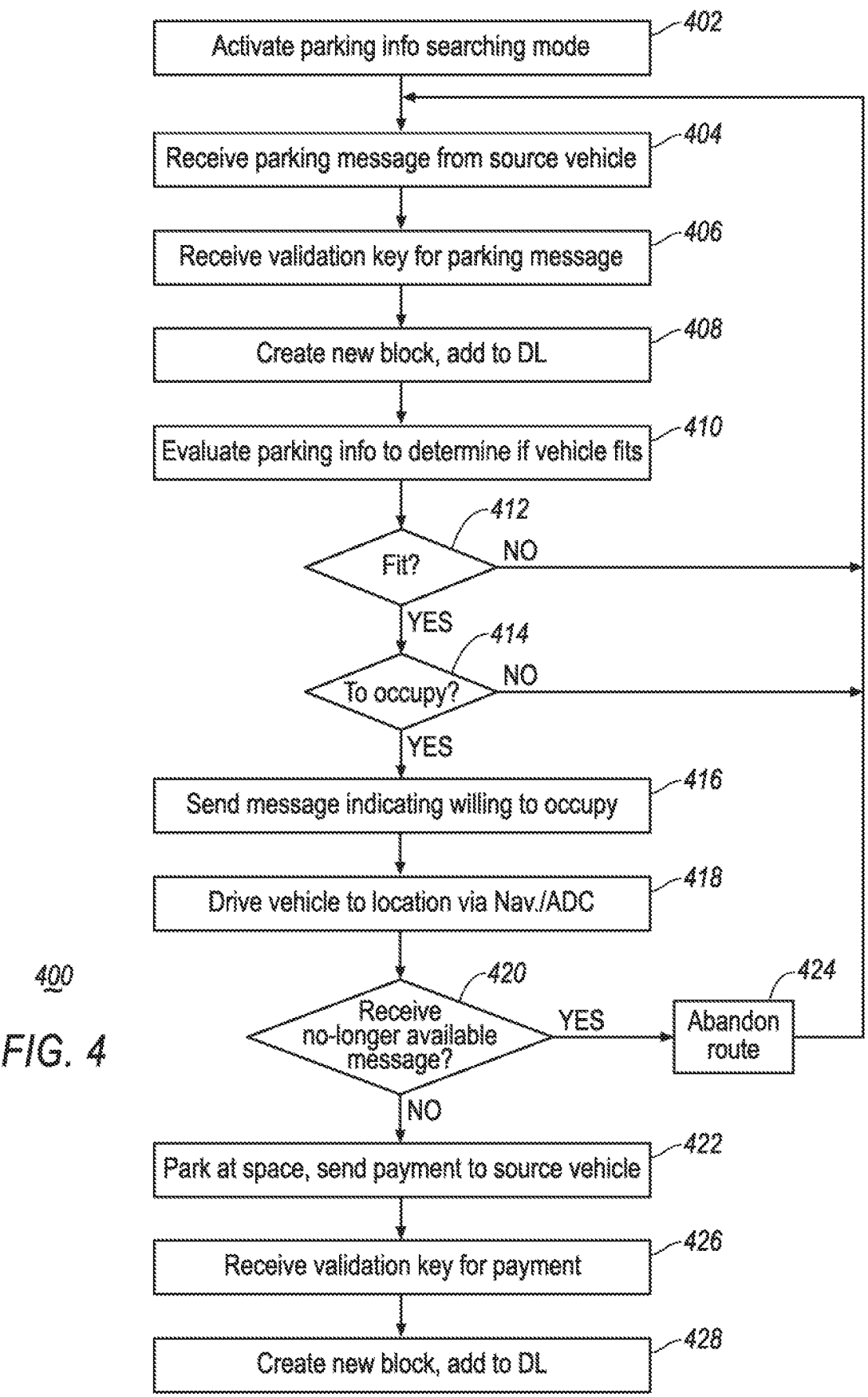
FIG. 4 illustrates an example process diagram for a process of another embodiment of the present disclosure.

Referring to FIG. 4, an example flow diagram for a process 400 of one embodiment of the present disclosure is illustrated. In the present embodiment, the process 400 is applied to a vehicle serving as a parking information receiving vehicle. At operation 402, the computing platform 104 activates the parking information sharing feature and enters into a parking space searching mode. Operation 402 may be triggered manually by a user input e.g. via the HMI controls 118. Alternatively, the computing platform 104 may automatically activate the parking space searching mode responsive to detecting a predefined condition is met e.g. the vehicle 102a enters into a geo-fence. Responsive to the activation of the parking space searching mode, the computing platform 104 connects to the blockchain network 202 and waits for parking messages from source fleet vehicles.

At operation 404, the computing platform 104 receives a parking message broadcasted to the blockchain network 202 from a source fleet vehicle. At operation 406, the computing platform 104 receives a validation key for the parking message from a validating entity and in response, creates a new block incorporating the payment and adds the block to the distributed ledger 138 stored in the storage 106 to record the parking message reporting at operation 408. Additionally, the new block created may further incorporate other transactions of the vehicle 102a or the fleet vehicles 102b . . . 102n depending on the transaction activities of the blockchain network 202. Before deciding if the vehicle 102a is to take the reported parking space, at operation 408, the computing platform evaluates the parking space information to determine if the vehicle 102a will fit into the parking space. For instance, the parking message received may include size information of the parking space measured by the source vehicle. The computing platform 104 may determine if the parking space is sufficient for the vehicle 102a by comparing the size of the parking space against a pre-configured size of the vehicle 102a. If the space is too small and the vehicle 102a does not fit, the process returns from operation 412 to operation 404 to continue to look for a new parking space. Otherwise, responsive to determining the vehicle 102a will fit the reported parking space, the process proceeds to operation 414 to decide if the operator of the vehicle 102a would like to occupy the parking space. A pop-up message may be output to the operator of the vehicle 102 via the display 116 notifying a space is available and offering the user options to occupy the space or to ignore it (e.g. via a button on a touch screen). In addition, the pop-up message may further include more information about the parking space included in the parking message, such as the location, distance from the vehicle 102a, and/or an image of the parking space captured by the source vehicle. In case that the parking information sharing feature is not free of charge, a price may be displayed with the pop-up message indicating the amount of money required if the vehicle 102a is to take the parking space. The price of the parking space may be pre-determined by the fleet manager 204 managing the parking information sharing system. Different price may be assigned to different area and time frame to the system. For instance, the price for a parking space in a popular area during rush hour may be set to $10.00, whereas the price for less popular area during off-peak hours may be set to $1.00. The fleet manager 204 may take a portion (e.g. 3%) of the total amount at each transaction as service fee. In case that the vehicle 102a is provided autonomous driving features operated by an ADC 156, the computing platform 104 may be configured to automatically decide to take the parking space responsive to detecting predefined conditions are met. For instance, some of the conditions may include a distance between the parking space and a destination, price range, a geo-fence configured by the vehicle user or fleet manager, or the like.

Responsive to deciding to take the space, the process proceed to operation 416 and the computing platform 104 sends a message to the blockchain network indicating the vehicle 102a would like to occupy the parking space and is driving to the location reported. The purpose of sending the message is to notify other fleet vehicles 102b . . . 102n about the intent of the vehicle 102a. However, the message may not be used to prohibit other vehicles to take the parking space at a "first come first served" basis. Alternatively, a reservation system may be used and only one fleet vehicle may reserve the parking space at a time. The reservation system may be applicable when the detected parking space is at a private parking lot managed by a private entity. The contact information of the private entity may be available from the fleet manager 204 or through the cloud 190. To reserve the parking space, the computing platform may generate a reservation message and send the reservation message to the private entity. Alternatively, the computing platform 104 may be configured to automatically dial a phone number of the private entity allowing the user of the vehicle 102a to reserve the parking space via the phone. In one example, the computing platform 104 may be required send a deposit to the blockchain network 202 along with the message indicating willing to occupy. The deposit may be held in an escrow maintained by the financial institution. Upon the vehicle 102a successfully parks at the reported parking space, the deposit may be deducted from the total payment and sent to the reporting vehicle. Otherwise, if the vehicle 102a fails to park at the reported parking space, the deposit may be return to the vehicle 102a.

In case of a racing condition when multiple vehicles send messages indicating the willing to occupy one parking space at the same time, a separate resolving mechanism may be used among the competing vehicles to resolve the conflict. For instance, the resolving mechanism may use a bidding system to award the parking space to the highest bidding vehicle. At operation 418, the computing platform 104 loads to location of the reported parking space contained in the parking message received from the blockchain network 202 onto the navigation controller 126 to start a navigation route to the target space. Additionally or alternatively, in case that the vehicle 102 is an autonomous driving vehicle, the ADC 156 may automatically operate the vehicle 102a to the target location and park into the target space.

As discussed previously, the parking space may be used on a "first come first served" basis. There may be a chance that another fleet vehicle arrives at the parking space before the vehicle 102a arrives, in which case the target parking space will be no-longer available by the time the vehicle 102a arrives. If at operation 420, the computing platform 104 receives a withdraw message from the blockchain network 202 originated from a fleet vehicle reporting it has already taken the target parking space, the process proceeds to operation 424, and the navigation controller and/or the ADC 156 abandons the current route, returns to operation 404 to continue to look for a new parking space.

Otherwise, the process proceeds to operation 422. Responsive to detecting the vehicle 102a has parked at the target space, the computing platform 104 sends the designated payment to the source vehicle via the blockchain network. The payment may be validated by a validating entity e.g. the fleet manager 204 or the miner 212 and at operation 426, the computing platform 104 receives a validation key. Responsive to receiving the validation key, at operation 428, the computing platform 104 creates a new block incorporating the payment based on a previous block and adds the block to the distributed ledger 138 stored in the storage 106 to complete the transaction.

Figure 5:
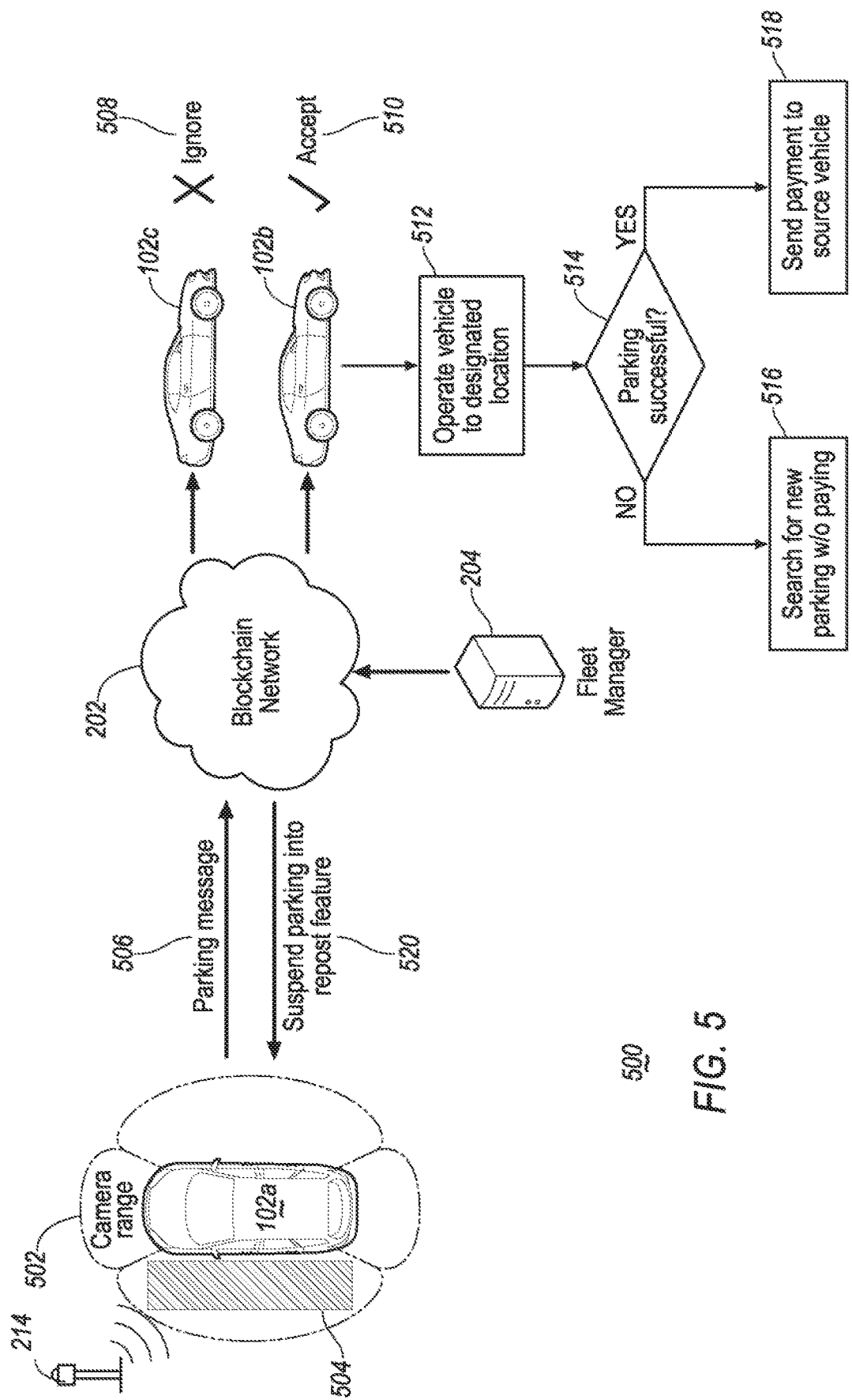
FIG. 5 illustrates a schematic diagram of the vehicle parking information sharing system of one embodiment of the present disclosure.

The operations of processes 300 and 400 may be applied to various situations. Referring to FIG. 5, a schematic diagram of the vehicle parking information sharing system of one embodiment of the present disclosure is illustrated. In the present example, the vehicle 102a serves as a parking information source vehicle and the fleet vehicles 102b and 102c serve as parking information receiving vehicles. The source vehicle 102a may activate the camera 162 as well as other sensors 160 to search for available parking spaces at the vicinity of the source vehicle 102a. As illustrated with reference to FIG. 5, the source vehicle 102a may be provided with the surrounding vehicle camera feature and each camera has range 502 which surrounds the source vehicle 102a as combined. To enhance measurement of objects and space detected via the camera 162, various sensors 160 may be used. For instance, the vehicle 102 may be equipped with one or more ultrasonic sensors 164 installed on the body of the vehicle 102 configured to detect objects within their range and calculate the distance from the objects. The utilization of ultrasonic sensors 164 may improve the accuracy of the distance measurement in addition to the image captured by the camera 162. However, the ultrasonic sensors usually require the objects to be detected (e.g. the edges) are fairly close (e.g. within 15 feet), and that there are no other obstacles between the ultrasonic sensors 164 and the object. In practice, the computer platform 104 may be configured to first use the image captured by the camera 162 to determine an approximate distance between the vehicle 102 and an object. If the range is within the range of the ultrasonic sensors 164, the computing platform 104 may activate the sensors 164 for further assessment. In case that there are multiple ultrasonic sensors 164, each one of the sensors 164 may be given a field of view in relation to the image giving the computing platform 104 a better assessment of the distance.

Additionally or alternatively, the vehicle 102 may be equipped with a radar sensor 166. In general, the radar sensor 166 has a longer range than the ultrasonic sensors 184. However, the radar sensor usually requires the object to be detected to be metal e.g. the body of vehicles. For instance, the radar sensors 166 may be used to measure the width of a narrow parking space between two vehicles. The vehicle 102 may be further equipped with a lidar sensor 168. The lidar sensor 168 functions much like the radar sensor 166 but removes the requirement for the object to be metal. However, lidar sensors in general are expensive and increases the cost of the system.

In the present example, for instance, the computing platform 104 detects an available parking space 504 to the left of the source vehicle 102*a*. The computing platform 104 may measure the size of the parking space 504 using data captured by the camera 162 as well as other sensors 160 to generate a parking message, and broadcast the parking message 506 to each peer node of the blockchain network 202 within a predefined geofence to share the parking information. As an example, the parking space 504 may be associated with an infrastructure device 214 such as a parking meter equipped with sensors and cameras configured to monitor the parking space 504. As illustrated, two fleet vehicles 102*b* and 102*c* with the parking information sharing feature in searching mode may receive the parking message from the source vehicle 102*a*. There may be other fleet vehicles received the parking message not illustrated in the Figure. As an example, while the fleet vehicle 102*c* ignores the parking message, the other fleet vehicle 102*b* accepts the parking message and starts to operate the vehicle 102*b* to the parking location designated in the parking message.

Without a reliable reservation system, other vehicles may take the parking space 504 before the fleet vehicle 102*b* arrives. If that is the case, a message indicating the parking space 504 is no-longer available may be sent to the fleet vehicle 102*b*. For instance, the parking space is taken by another fleet vehicle (hereinafter the third fleet vehicle) of the blockchain network 202, the third fleet vehicle may generate and send the message to the fleet vehicle 102*b* informing the parking space 504 is no longer available. Alternatively, in case that the source vehicle 102*a* is parked nearby the parking space 504, the source vehicle 102*a* may detect someone else (a vehicle within or not within the fleet) has taken the parking space 504 before the fleet vehicle 102*b* arrives and send the message to the fleet vehicle 102*b*. Alternatively, the infrastructure device 214 may detect and identify the vehicle parked at the parking space 504 to increase the accuracy and robustness of the system. If the fleet vehicle 102*b* fails to successfully park at the designated parking space 504, the vehicle 102*b* continues to search for a new parking space within the predefined geo-fence without paying the source vehicle 102*a* at operation 516. Otherwise, responsive to detecting a successful parking at the designated space 504, the fleet vehicle 102*b* sends the designated payment to the source vehicle 102*a* via the blockchain network 202 at operation 518.

To increase the confidence level of the parking information being sharing across the blockchain network 202, the system may be configured to allow other fleet vehicles to validate and cross verify the reported parking information. For instance, after the source vehicle 102*a* has sent the parking message to the blockchain network 202 to report the available parking space 504, the parking information sharing system may allow one or more other fleet vehicles in the local area to validate or deny the availability of the reported parking space according to their own detections.

The parking information sharing system may be managed by a fleet manager 204. Each vehicle may be associated with a reputation level indicative of the reputation of the vehicle based on previous reporting activities. For instance, the reputation level may increase responsive to the vehicle accurately reporting available parking spaces cross-verified by other parties (e.g. other vehicle, or infrastructure devices). The reputation level may decrease if the vehicle reports inaccurate information. The fleet manager 204 may be configured to suspend certain vehicles from reporting parking space information based on the poor reputation level of a reporting vehicle. Additionally, the fleet manager 204 may be further configured to suspend certain vehicles from reporting parking space information based on the geolocation history of the vehicles to prevent the participants from monopolizing the peer-to-peer vehicle information sharing network. For instance, the fleet manager 204 may send an instruction 520 to suspend the vehicle 102*a* from being a source vehicle for a certain among of time (e.g. 2 hours) because the vehicle 102*a* has been staying within a certain area for too long or making too many reports from the area above a predefined threshold.

Figure 6:
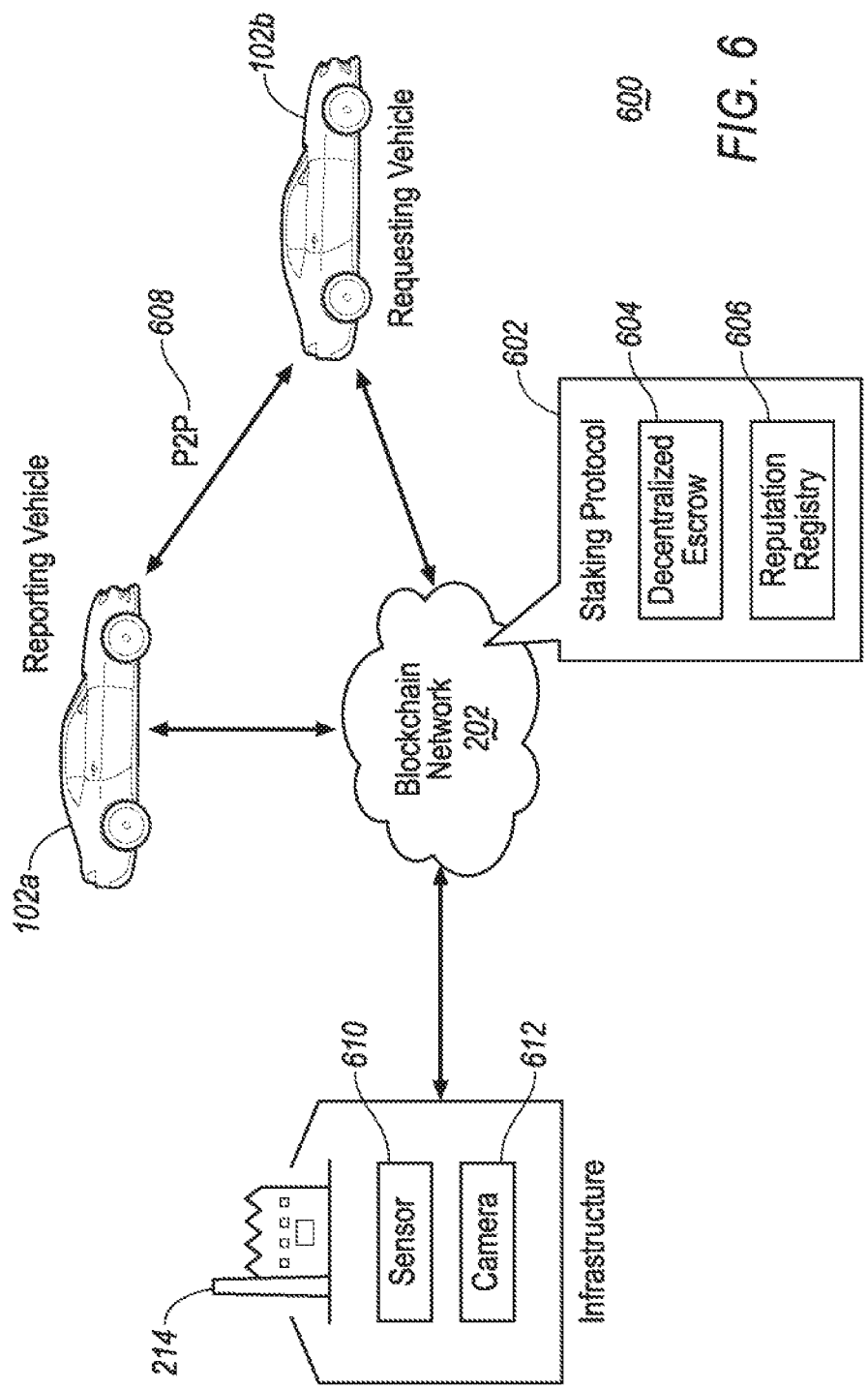
FIG. 6 illustrates a schematic diagram of the vehicle parking information sharing system of another embodiment of the present disclosure.

Referring to FIG. 6, a diagram 600 of the vehicle parking information sharing system of one embodiment of the present disclosure is illustrated. A staking protocol 602 is utilized in the present embodiment to further enhance the robustness and accuracy of the vehicle parking information sharing system. The staking protocol may include a decentralized escrow 604 and a reputation registry 606. The decentralized escrow 604 may be built on top of the blockchain network 202. When a reporting vehicle 102*a* makes a report that there is a parking spot available, this reporting vehicle 102*a* may be required to put a predefined reporting fee into the escrow 604. This reporting fee may be used to make sure that the reporting vehicle 102*a* does not maliciously report on non-vacant spots or spam the system with a flood of reports. Once the available parking location message is sent to the blockchain network 202, a peer node (a.k.a a requestor or requesting vehicle) e.g. a fleet vehicle 102*b* can request to view the data. In order to view the data, the requesting vehicle 102*b* may also be required put money into the decentralized escrow 604. Once the requesting vehicle 102*b* funds the escrow account 604, the blockchain staking protocol 602 may facilitate the data transfer. As an example, the parking data may be private to fleet vehicles prior to the authorization that takes place after the requesting vehicle 102*b* places the money in the escrow 604. The data may be a hash or encryption of the original location. A third party such as the fleet manager 204 may be configured to oversee queries from the requesting vehicle 102*b* and the parking data. In this case, once the escrow is paid by the requesting vehicle 102*b*, facilitated by the fleet manager 204, the original reporting vehicle 102*a* can then directly pass the data to the requester using a secure encrypted peer-to-pear (P2P) channel 608. For instance, the P2P channel 608 may be a part of a vehicle network independent from or overlapping with the blockchain network 202 configured to provide communications between vehicles. Once the requesting vehicle 102*b* has parked in the reported location, the infrastructure 214 such as the parking spot may be able to detect the vehicle 102 via sensors 10 and/or cameras 612 and redundantly prove to the rest of the network 202 that the vehicle did park in that spot. This redundancy may protect against malicious behavior. Furthermore, the decentralized escrow 604 may refund the reporting vehicle 102*a* the original reporting amount held in escrow 604, and pay the reporting vehicle 102*a* the requesting vehicle 102*b* amount held in escrow 604, minus any network fees.

In order for the vehicle parking information sharing system to be protected from malicious behavior, the reputation registry 606 may be used. The reputation registry 606 may include a list of account addresses that each may be associated with a reputation value. The reputation value may include points assigned to each account, either automatically by the system or individually from the peers. In general, reputation values are meant to keep track of user behavior and whether or not the users have performed inappropriately or maliciously. Different fee charges may be applied to vehicles with different reputation level. For instance, the system may charge a lower transaction fee for those vehicles with high reputation values as compared with for those vehicles with low reputation values. Using the example illustrated with reference to FIG. 6, if the requesting vehicle 102b asks for a parking space and parks in that space, but misreports by saying that it did not park to avoid paying the fee, then—in case that the infrastructure 214 is able to determine that the requesting vehicle 102b misreported and indeed did park in the space—the system may detect this misreport and notify the rest of the peers on the blockchain network 202. In addition, the system may discredit the reputation value of the requesting vehicle 102b as a punishment.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
  a controller, programmed to
    responsive to detecting a parking space via a camera, generate a parking message including location information about the parking space;
    broadcast the parking message to fleet vehicles within a predefined geofence, each of the fleet vehicles serving as a node of a blockchain network;
    receive, from one of the fleet vehicles serving as a node of the blockchain network, a message indicative of an intent to occupy the parking space; and
    receive a predefined reward, via the blockchain network, from the one of the fleet vehicles having successfully occupied the parking space.

2. The vehicle of claim 1, wherein the controller is further programmed to
  detect the parking space via one or more sensors;
  measure a size of the parking space detected via the camera and the one or more sensors; and
  incorporate the size of the parking space into the parking message.

3. The vehicle of claim 2, wherein the one or more sensors include at least one of: an ultrasonic sensor; a radar sensor; or a lidar sensor.

4. The vehicle of claim 1, wherein the controller is further programmed to
  capture an image of the parking space via the camera; and
  incorporate the image into the parking message.

5. The vehicle of claim 1, wherein the controller is further programmed to
  responsive to receiving a validation for the parking message from a node of the blockchain network, add a block for the parking message to a distributed ledger stored locally.

6. The vehicle of claim 1, wherein the controller is further programmed to
  responsive to receiving a validation for the reward from the one of the fleet vehicles having successfully occupied the parking space, add a block for the reward to a distributed ledger stored locally.

7. The vehicle of claim 1, wherein the controller is further programmed to
  responsive to receiving a suspension message from a fleet manager serving as a node of the blockchain network, suspend generating and sending new parking messages for a period of time specified in the suspension message.

8. The vehicle of claim 1, wherein the camera is a surrounding view camera having multiple camera sensors configured to capture a plurality of images around the vehicle.

9. The vehicle of claim 1, wherein the controller is further programmed to
  responsive to detecting the parking space has been occupied by a unexpected vehicle other than the one of the fleet vehicles intended to occupy, broadcast a withdraw message indicative the parking space is no longer available to the blockchain network.

10. A system for a vehicle, comprising:
  one or more controllers, programmed to
    responsive to receiving, from a source vehicle serving as one of a plurality of fleet vehicles each operating as a node of a blockchain network, a parking message reporting a parking space, evaluate the parking message to detect if the vehicle will fit into a parking space;
    responsive to detecting the vehicle will fit into the parking space, set a location of the parking space incorporated in the parking message as a navigation destination;
    send a message to predefined nodes of the blockchain network indicative an intent to occupy the parking space; and
    responsive to detecting the vehicle successfully occupied the parking space, send a predefined payment to the source vehicle via the blockchain network.

11. The system of claim 10, wherein the one or more controllers are further programmed to
  automatically operate the vehicle to the location of the parking space via an autonomous driving controller.

12. The system of claim 10, wherein the one or more controllers are further programmed to
  obtain contact information of an entity managing the parking space reported by the source vehicle; and
  initiate a contact to the entity to reserve the parking space.

13. The system of claim 10, wherein the one or more controllers are further programmed to
  responsive to receiving a withdraw message indicative the parking space is no longer available, terminate navigation route to the parking space.

14. The system of claim 13, wherein the withdraw message is received from the source vehicle.

15. The system of claim 13, wherein the withdraw message is received from one of fleet vehicles which is not the source vehicle.

16. A method for a vehicle, comprising:
  entering into a parking information reporting mode by activating a camera and multiple sensors to detect an available parking space within a predefined vicinity of the vehicle;
  responsive to detecting the parking space, measuring a size of the parking space;
  generating a parking message incorporating information describing a location of the parking space, the size of the parking space, and a designated price of a reward;
  broadcasting the parking message to a predefined blockchain network within a predefined geofence;

receiving, from one of the fleet vehicles serving as a node of the blockchain network, a message indicative of an intent to occupy the parking space; and receive the designated reward from the one of a fleet vehicle successfully occupied the parking space via blockchain network.

17. The method of claim 16, further comprising:

responsive to receiving a suspension message from a fleet manager via the blockchain network, suspending the parking information reporting mode for a period of time designated in the suspension message.

18. The method of claim 16, further comprising:

responsive to receiving a validation for the parking message from a node of the blockchain network, add a block for the parking message to a distributed ledger stored locally.

19. The method of claim 16, further comprising:

responsive to receiving a validation for the reward from one of the fleet vehicles successfully occupied the parking space as a node of the blockchain network, add a block for the reward to a distributed ledger stored locally.

\* \* \* \* \*